US008848533B1

(12) United States Patent
Stuart et al.

(10) Patent No.: US 8,848,533 B1
(45) Date of Patent: Sep. 30, 2014

(54) TIME DIVISION MULTIPLEX PACKET FABRIC INGRESS SCHEDULER AND METHOD

(75) Inventors: David Stuart, Almonte (CA); Andrew Jarabek, Nepean (CA); James Tierney, Carp (CA)

(73) Assignee: Ciena Corporation, Hanover, MD (US)

( * ) Notice: Subject to any disclaimer, the term of this patent is extended or adjusted under 35 U.S.C. 154(b) by 331 days.

(21) Appl. No.: 13/204,337

(22) Filed: Aug. 5, 2011

Related U.S. Application Data

(60) Provisional application No. 61/371,311, filed on Aug. 6, 2010.

(51) Int. Cl.
 *H04L 1/00* (2006.01)
 *H04L 12/26* (2006.01)

(52) U.S. Cl.
 USPC ......... 370/235; 370/252; 370/395.4; 709/238

(58) Field of Classification Search
 USPC .................. 370/235, 252, 395.4; 709/238
 See application file for complete search history.

(56) References Cited

U.S. PATENT DOCUMENTS

| 6,711,028 | B2 | 3/2004 | Iny |
| 7,088,731 | B2 | 8/2006 | Iny |
| 7,095,744 | B2 | 8/2006 | Iny |
| 7,333,502 | B2 | 2/2008 | Henderson et al. |
| 7,525,995 | B2 | 4/2009 | Iny |
| 7,619,970 | B2 | 11/2009 | Iny |
| 2003/0058877 | A1 | 3/2003 | Rumph |
| 2003/0063562 | A1* | 4/2003 | Sarkinen et al. ............. 370/230 |
| 2005/0128948 | A1 | 6/2005 | Kuo et al. |
| 2005/0138243 | A1 | 6/2005 | Tierney et al. |
| 2008/0279106 | A1* | 11/2008 | Goodfellow et al. ......... 370/238 |
| 2009/0010152 | A1* | 1/2009 | Ofek et al. .................... 370/216 |
| 2009/0028560 | A1* | 1/2009 | Best et al. ....................... 398/45 |
| 2009/0097497 | A1* | 4/2009 | Smiljanic ...................... 370/458 |
| 2011/0090912 | A1* | 4/2011 | Shippy .......................... 370/400 |

* cited by examiner

*Primary Examiner* — Alpus H Hsu
*Assistant Examiner* — Walter Divito
(74) *Attorney, Agent, or Firm* — Clements Bernard PLLC; Christopher L. Bernard; Lawrence A. Baratta, Jr.

(57) ABSTRACT

The present disclosure provides a fabric ingress scheduler and method that distributes ingress packet traffic in a time division multiplex (TDM) system, both fabric interface aggregate and per connection, deterministically across fabric paths. Advantageously, the fabric ingress scheduler and method minimizes fabric latency and prevents fabric interface head-of-line blocking. The fabric ingress scheduler and method utilizes the fact that each connection flow has a known maximum rate which must be reserved through the fabric for prevention of data loss (essentially circuit switching using a packet fabric). In exemplary embodiments, the fabric interface supports per packet fabric path selection. Generally, the fabric ingress scheduler and method generally provides a deterministic scheduling of ingress packets to fabric paths.

16 Claims, 15 Drawing Sheets

TIME DIVISION MULTIPLEX PACKET FABRIC INGRESS SCHEDULER AND METHOD

CROSS-REFERENCE TO RELATED APPLICATION(S)

The present non-provisional patent application claims priority to U.S. Provisional Patent Application Ser. No. 61/371,311, filed Aug. 6, 2010, and entitled "TIME DIVISION MULTIPLEX PACKET FABRIC INGRESS SCHEDULER AND METHOD," which is incorporated in full by reference herein.

FIELD OF THE INVENTION

The present invention relates generally to switching time division multiplexed (TDM) connections over a packet fabric and, more specifically, to a system and method for distributing packetized ingress Time Division Multiplex (TDM) traffic, deterministically across multiple fabric switching devices, i.e. fabric units.

BACKGROUND OF THE INVENTION

In optical networks, TDM systems, such as Synchronous Optical Network (SONET), Synchronous Digital Hierarchy (SDH), Optical Transport Network (OTN), and the like, are evolving to support layer two (L2) Ethernet traffic and switching thereof. This functionality is typically incorporated within network elements in such networks via silicon-based packet switching fabrics. A specific area of concern is how packets are distributed by fabric interfaces (FIs) across multiple queue-based packet fabric units that make up the switching fabric. Characteristics of a conventional switching system include: non-blocking fabric, low latency, minimal packet loss, minimal fabric link speedup, high availability through fabric redundancy, and hitless fabric maintenance switching. To achieve a non-blocking system, both the fabric interface aggregate load and the per connection loads must be distributed evenly across the active working set of fabric units and paths. To minimize latency across the fabric units and paths, the fabric unit output queue depths must be minimized without use of flow control. To minimize latency across the ingress fabric interface, the distribution of ingress packets across ingress fabric links must minimize the per link First-In-First-Out (FIFO) fill and eliminate the possibility of fabric interface common FIFO head-of-line blocking. To eliminate the possibility of packet loss due to fabric unit output queue congestion, the fabric unit output queues must never overflow. In view of the foregoing, fabric link speedup should be minimized since it adds to the system cost and inhibits the maximum switching capacity from being fully leveraged.

BRIEF SUMMARY OF THE INVENTION

In an exemplary embodiment, a method includes receiving source signals; segmenting packets from the source signals; buffering the packets; and scheduling and distributing the packets to a plurality of fabric units in a deterministic manner. The scheduling and distributing the packets may include scheduling the packets towards the fabric via a fabric interface; and distributing the scheduled packets to the plurality of fabric units using a fabric path distribution list of fabric paths associated with the plurality of fabric units. The method may further include performing the scheduling based on a calendar of effective length n, n being an integer; and performing the distributing based on a fabric path distribution list of length m, m being an integer, and n and m may be relatively prime. The fabric path distribution list may include a number of entries for each of the fabric paths proportional to bandwidth associated with each. The scheduling the packets may include assigning a packet source or idle to a plurality of calendar slots forming a calendar period; and the distributing may include, for each packet, sending the packet to one of the plurality of fabric paths based on a current fabric path distribution list entry in the fabric path distribution list and updating the current pointer; and, for each idle, updating the current fabric path distribution list entry. The distributing may utilize the fabric path distribution list in a repetitive fixed order. The method may include progressing one fabric path distribution list entry in the fabric path distribution list for every effective calendar slot. The plurality of fabric units may be included on a plurality of switch modules; and the method may include adding or removing one of the plurality of switch modules from the distributing in service. The plurality of fabric units may be selected without requiring speed up. The deterministic manner may include each effective calendar slot associating with each distribution list entry of the fabric path distribution list once every m calendar periods.

In another exemplary embodiment, a packet fabric ingress scheduler includes one or more ingress buffers receiving packets from source signals; a calendar scheduler configured to select each of the packets from the one or more ingress buffers; a selector connected to a plurality of fabric units and receiving the packets from the one or more ingress buffers based on the calendar scheduler; and a fabric path distribution list scheduler configured to distribute packets to the plurality of fabric units from the selector. The calendar scheduler and the fabric path distribution list scheduler may be configured to distribute the packets to the plurality of fabric units in a deterministic manner. The calendar scheduler may be configured to select each of the packets into one of a plurality of slots associated with a calendar period; and the fabric path distribution list scheduler may be configured to distribute the packets based on a fabric path distribution list of fabric paths associated with the plurality of fabric units. The fabric path distribution list may include a number of entries for each of the fabric paths proportional to bandwidth associated with each. The calendar period may include an effective length n, n being an integer; and the fabric path distribution list may include a length m, m being an integer, and n and m may be relatively prime. Each of the calendar scheduler and the fabric path distribution list scheduler may include a pointer that is updated concurrently.

In yet another exemplary embodiment, a system includes one or more port cards; one or more switch modules including a plurality of fabric units; a plurality of fabric paths interconnecting the one or more port cards and the plurality of fabric units; and a scheduling system to provide packetized traffic from time division multiplexed or constant bit rate signals to the plurality of fabric units in a deterministic manner. The one or more switch modules may be configured to switch the packetized traffic and native packet traffic thereon. The scheduling system may include a calendar scheduler configured to select packets from the packetized traffic from one or more buffers; a selector connected to a plurality of fabric units and receiving the packets from the one or more buffers based on the calendar scheduler; and a fabric path distribution list scheduler configured to distribute packets to the plurality of fabric units from the selector.

BRIEF DESCRIPTION OF THE DRAWINGS

The present invention is illustrated and described herein with reference to the various drawings of exemplary embodiments, in which like reference numbers denote like method steps and/or system components, respectively, and in which:

FIG. 7 is a flowchart of a packet distribution method of the present invention utilizing the source signal distribution method of FIG. 5a and the aggregate distribution method of FIG. 6a;

DETAILED DESCRIPTION OF THE INVENTION

In various exemplary embodiments, the present disclosure provides a fabric ingress scheduler and method that distributes ingress packet traffic deterministically across fabric units. Advantageously, the fabric ingress scheduler and method minimizes fabric latency and prevents fabric interface head-of-line blocking. The fabric ingress scheduler and method utilizes the fact that each connection flow has a known maximum rate which must be reserved through the fabric units for prevention of data loss (essentially circuit switching using a packet fabric). In one exemplary embodiment, the ingress scheduler resides in the same device as Segmentation and Reassembly (SAR) functionality and communicates the fabric path selection to the fabric interface with each packet. In another exemplary embodiment, the ingress scheduler resides in the fabric interface device separate from the SAR. In a third exemplary embodiment, the SAR, the ingress scheduler and the fabric interface all reside in the same device. In all exemplary embodiments, the fabric interface supports per packet fabric path selection to the fabric units and paths.

Figure 1:
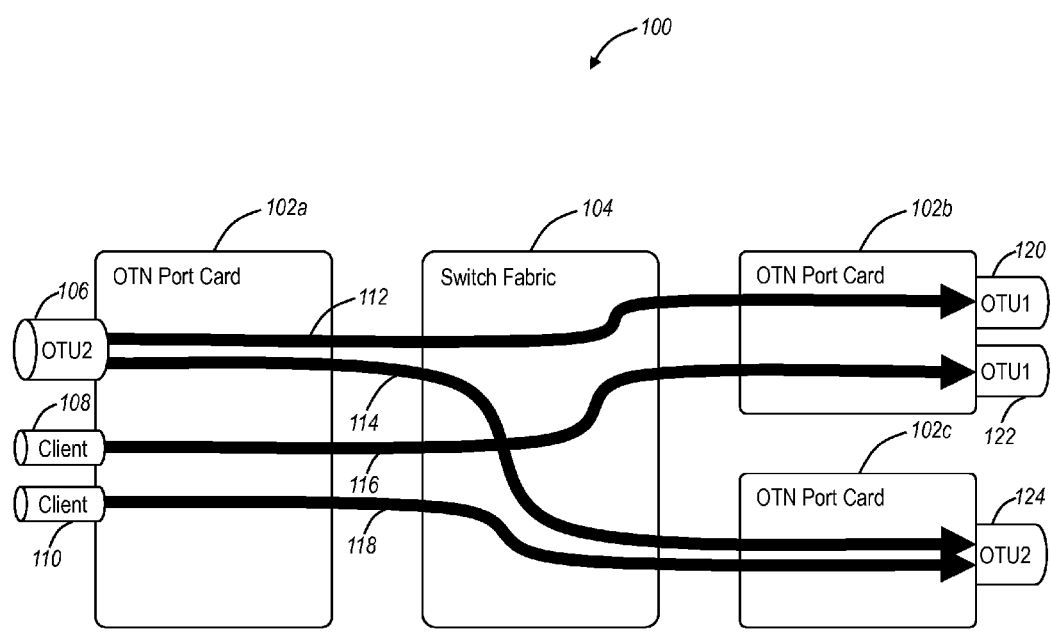
FIG. 1 is a block diagram of a switching operation of an exemplary embodiment of the present invention using port cards and a switch fabric.

Referring to FIG. 1, in an exemplary embodiment, a block diagram illustrates an OTN switching operation 100 using port cards 102 and a switch fabric 104. The switching operation 100 includes an ingress port card 102a with an Optical channel Transmission Unit level 2 (OTU2) input 106 and two client inputs 108, 110. The OTU2 input 106 provides two Optical channel Data Unit level 1 (ODU1) signals 112, 114, the client 108 provides an ODU1 signal 116, and the client 110 provides an ODU1 signal 118. The switching operation 100 includes two egress port cards 102b, 102c with the port card 102b including two ODU1 outputs 120, 122 and the port card 102c include an ODU2 output 124. The switch fabric 104 is a queue based packet switching fabric. In this exemplary embodiment, the switch fabric 104 is configured to switch the signal 112 from the OTU2 input 106 to the OTU1 output 120, the signal 114 from the OTU2 input 106 to the OTU2 output 124, the signal 116 from the client input 108 to the OTU1 output 122, and the signal 118 from the client input 110 to the OTU2 output 124. In general, the port cards 102 and the switch fabric 104 may be part of a network element, a node, a switch, etc. with communication between the port cards 102 and the switch fabric 104 via a back plane, a mid plane, or the like. In general, the port cards 102 and the switch fabric 104 may include various optical, optoelectronic, and electrical components. Note, in the various exemplary embodiments described herein reference is made to OTN for illustration purposes. Those of ordinary skill in the art will recognize the present invention contemplates use with other protocols, such as, but not limited to, SONET, SDH, and the like. Furthermore, the switching operation 100 is illustrated in FIG. 1 in a unidirectional manner and without redundancy for illustration purposes only.

Figure 2:
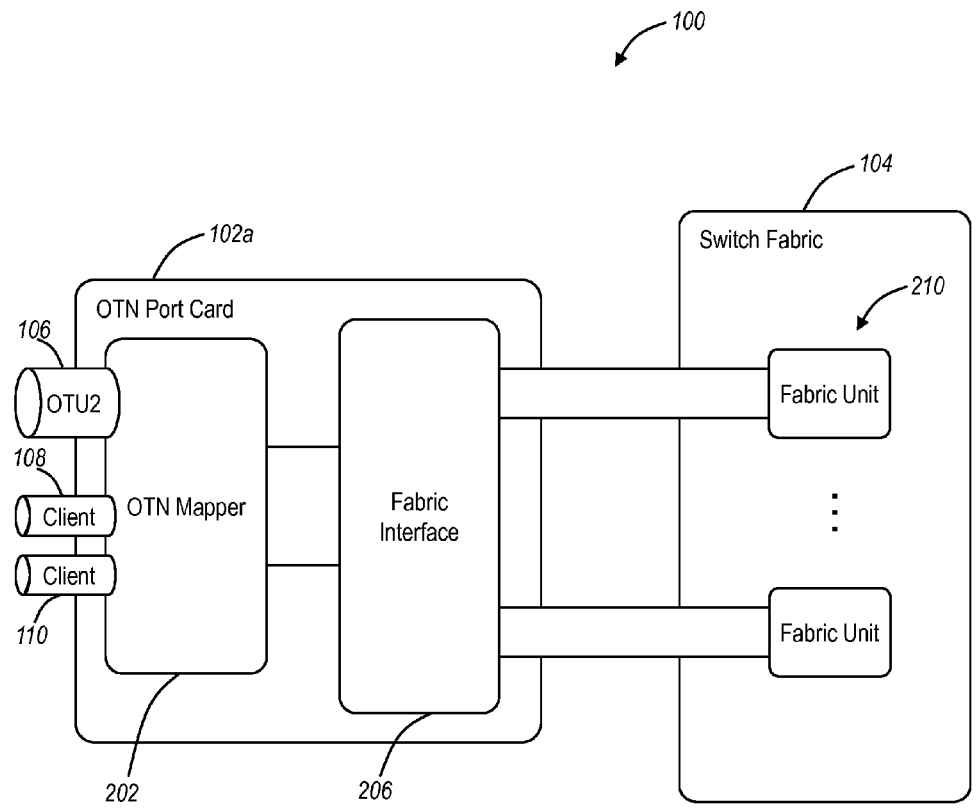
FIG. 2 is a block diagram of dataflow in the switching operation of FIG. 1 from an ingress port card to the switch fabric.
Figure 3:
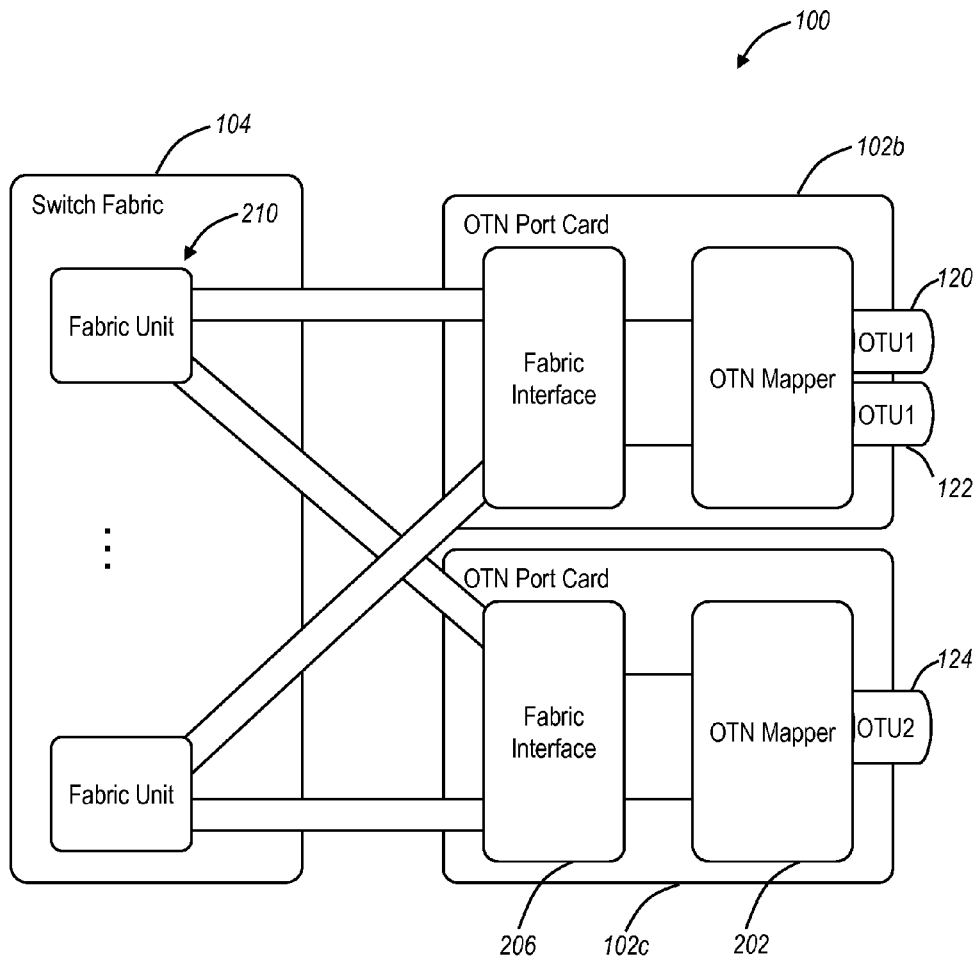
FIG. 3 is a block diagram of dataflow in the switching operation of FIG. 2 from the switch fabric to an egress port card.

Referring to FIGS. 2 and 3, in exemplary embodiments, block diagrams illustrate dataflow in the OTN switching operation 100 of FIG. 1 using the port cards 102 and the switch fabric 104. In particular, FIG. 2 illustrates dataflow from the OTN port card 102a to the switch fabric 104, and FIG. 3 illustrates dataflow from the switch fabric 104 to the OTN port cards 102b, 102c. The port cards 102a, 102b, 102c include an OTN mapper 202 and a fabric interface 206. The switch fabric 104 includes a plurality of fabric units 210 interconnected with the fabric interfaces 206. In FIG. 2, the OTN mapper 202 is configured to receive the signals 106, 108, 110. In particular, the frames from the OTU2 signal 106 are received by the mapper 202 and demapped and demultiplexed into two ODU1s, and the client signals 108, 110 are received by the mapper 202 and mapped to an ODUk (Optical channel Data Unit level k) which is an ODU1 in this case.

The OTN Mapper 202 segments the ODUk flows to be switched into switchable packets. One or more headers are added which include: fabric unit load balancing (steering) instructions, fabric routing instructions, timing information required for restoring ODUk timing at egress, and a timestamp for fabric latency tuning. From the OTN Mapper 202, the fabric interface 206 applies a coarse fabric element steering instruction to evenly balance (spray) the traffic across all active fabric units 210 and paths therein. For example, the fabric routing instructions may include a label that the fabric (including fabric interfaces and fabric units) use to ensure that the packet reaches the correct reassembly context in one or more egress SARs. Hardware circuits within the fabric interface 206 manage the fine grain load balancing within a group of serial links to each fabric unit 210. Each of the fabric units 210 receives an equal portion of the traffic load from each port card 102a via the fabric interface 206. Each of the fabric units 210 is programmed with a switching map which is applied to its portion of the switching load. Each fabric unit 210 can reach every destination fabric interface 206 in the shelf, i.e. any of the port cards 102a, 102b, 102c. In FIG. 3, the fabric interfaces 206 in the port cards 102b, 102c aggregate packets from all fabric units 210 into their respective flows in their original ingress order based on the fabric routing instructions. The OTN Mapper 202 in the port cards 102b, 102c performs re-assembly of the ODUs and maps the ODUs to the OTU/Client/Line format complete with restored timing. A timestamp in the fabric packet header is used to tune the jitter/latency compensation buffer for constant fabric latency.

The fabric ingress scheduler and method is directed to switching TDM connections over a packet fabric, i.e. the switch fabric 104. In particular, connected TDM flows are segmented into packets by an ingress Segmentation and Reassembly (SAR) function. The packets may be a fixed size or a variable size that varies by a nominal amount such as by a few bytes. This ingress SAR function precedes a fabric interface function, i.e. the fabric interfaces 206. The fabric ingress scheduler and method relates to how packets are distributed by the fabric interfaces 206 across the multiple queue-based packet fabric units 210 and paths therein that include the switch fabric 104. In an exemplary embodiment, the fabric ingress scheduler and method provides an ingress scheduler that distributes ingress packet traffic, both fabric interface aggregate and per connection, deterministically across the fabric units 210. The fabric ingress scheduler and method is based on the fact that each connection flow has a known maximum rate which must be reserved through the fabric for prevention of data loss (essentially circuit switching using a packet fabric). The fabric interface is designed to support per packet fabric path selection.

Advantageously, the fabric ingress scheduler and method provide desired switch fabric characteristics. The deterministic and even distribution of both the fabric interface aggregate load and the per connection loads results in a non-blocking fabric. This distribution also minimizes fabric unit output queue depths, which eliminates the probability of packet loss due to fabric unit output queue overflow and minimizes per fabric unit latency. Any additional latency in the SAR and the fabric interface due to the ingress scheduler is minimal, and there is no probability of packet loss due to head-of-line blocking in the fabric interface. The ingress scheduler requires no additional fabric link speedup, allowing more usable capacity for the same infrastructure cost. Fabric redundancy is also supported as is hitless fabric maintenance switching. Since a single fabric architecture can be used for both TDM and packet switching, the system cost and complexity of including separate packet and TDM switch fabrics can be avoided. Note, the port cards 102a, 102b, 102c can have both OTN flows that need to be switched and packet flows (which may first need to be de-mapped from an OTN flow and then routed to the fabric interface 206). The packet flows would need to by-pass the OTN-to-packet adaptation and ingress scheduler and feed the fabric interface directly but into separate queues (or virtual queues). It assumed that OTN traffic would have strict priority over packet flows as additional latency and jitter cannot be tolerated.

Figure 4:
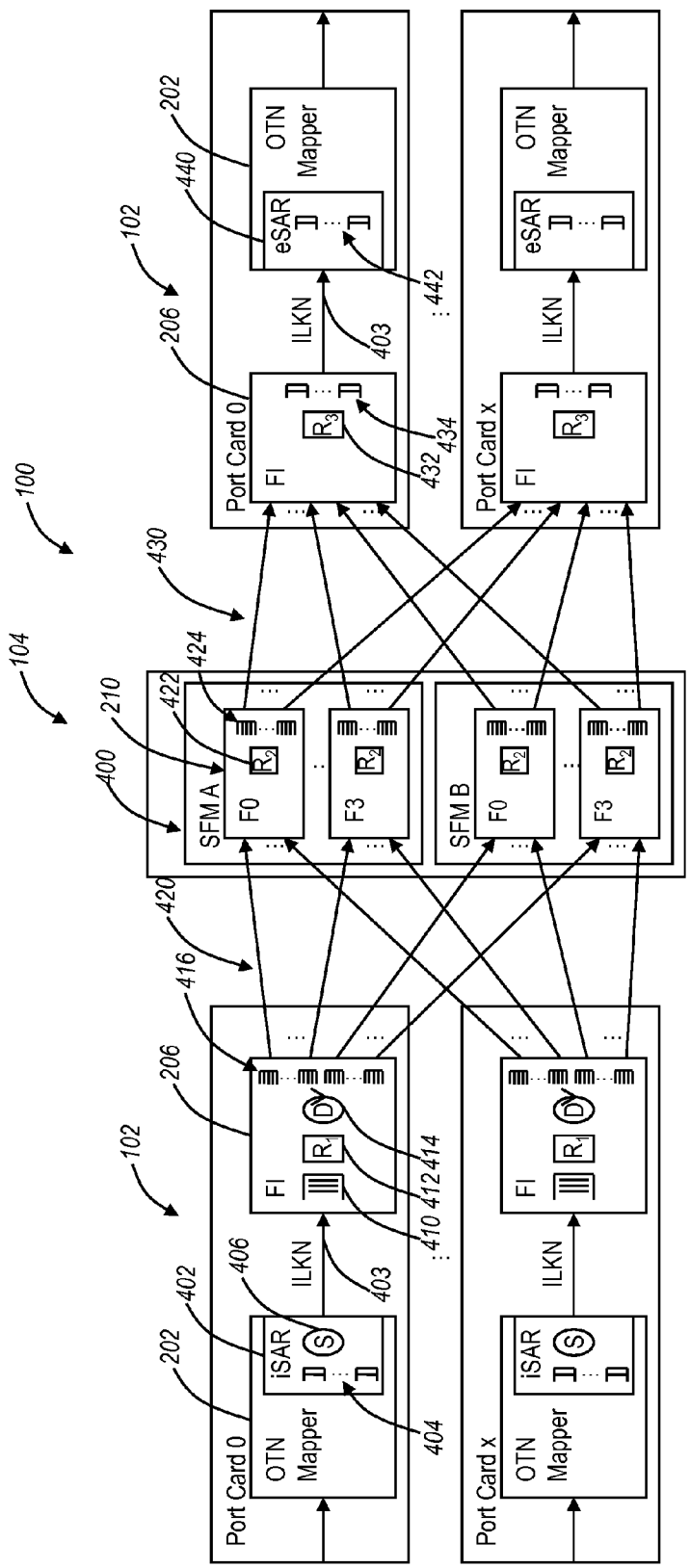
FIG. 4 is a block diagram of exemplary components in the switching operation of FIG. 1 using multiple port cards and multiple switch fabric modules.

Referring to FIG. 4, in an exemplary embodiment, block diagrams illustrate exemplary components in the OTN switching operation 100 of FIG. 1 using multiple port cards 102 and multiple fabric units 210 in the switch fabric 104. FIG. 4 illustrates multiple switch fabric modules 400 for redundancy. In this exemplary embodiment, the OTN switching operation 100 includes 40 Gbps on each of the port cards 102 with 1:1 fabric protection and four fabric units 210 per switch fabric module 400. Each of the OTN Mappers 204 may include an ingress SAR 402 (iSAR) that connects to a fabric interface 206 via the inter-device interface 403. The ingress SARs 402 are configured to provide ODUk byte stream to fabric packet segmentation. Each of the ingress SARs 402 may include various shallow FIFOs 404, e.g. FIFO per switched ODU, and an ingress scheduler 406. The fabric interface 206 is configured to interface to each of the fabric units 210 providing a distribution of packets over fabric links. The fabric interface 206 includes a common FIFO 410 connected to the ingress SAR 402 via the interface 403, a selector ($R_1$) 412 configured to select fabric path link groups, a distributor (D) 414 configured to distribute packets over selected links, and various shallow FIFOs 416 per link. In an exemplary embodiment, there may be three links per link group (i.e., a fabric path 420). Thus, each of the FIFOs 416 handle a link connecting a fabric interface 206 to a fabric unit 210.

Each of the fabric units 210 include a selector ($R_2$) 422 configured to select a destination fabric interface 206 output link group based on the fabric routing instructions in the packet header. The fabric unit 210 is configured to queue packets by destination fabric interface 206. The fabric units 210 further include FIFOs 424 per link with load balancing within a destination fabric interface link group 430. The FIFOs 424 connect the fabric units 210 to various fabric interfaces 206 on egress port cards 102. In an exemplary embodiment, there may be three links per egress link group 430, so that the ingress and egress fabric paths are symmetric. In general, there is a single egress fabric path 430 from a fabric unit 210 to each fabric interface 206. The egress fabric path 430 has at least the same bandwidth as the ingress fabric links provide from each fabric interface 206 to the same fabric unit 210. For egress, the fabric interfaces 206 include a selector ($R_3$) 432 and various FIFOs 434. Here, the fabric interfaces 206 select an egress Interlaken channel for sending the packets to the OTN Mapper 204 over the inter-device interface 403. For egress, the OTN Mapper 204 includes an egress SAR 440 which includes various FIFOs 442 providing fabric latency smoothing buffers. The egress SAR 440 reassembles packet flows into ODUk byte streams. In an exemplary embodiment, the fabric ingress scheduler and method includes functionality on the ingress SAR 402 enabling a monolithic non-blocking fabric where each ODUk/flex is distributed evenly across the working set of fabric units 210. Note, the fabric ingress scheduler and method is described herein with respect to ODUk (Optical channel Data Unit level k) as well as ODUFlex or variants thereof. The reference to "flex" may be a subunit of a particular ODUk. This arrangement minimizes fabric latency by minimizing maximum fill of fabric queues including the FIFOs 416, the FIFOs 424, and the FIFOs 434. In FIG. 4, the fabric ingress scheduler and method further allows for flexible use of the switch fabric modules 400, i.e., A only, B only, A&B load sharing (50% of traffic on each).

Figure 7:
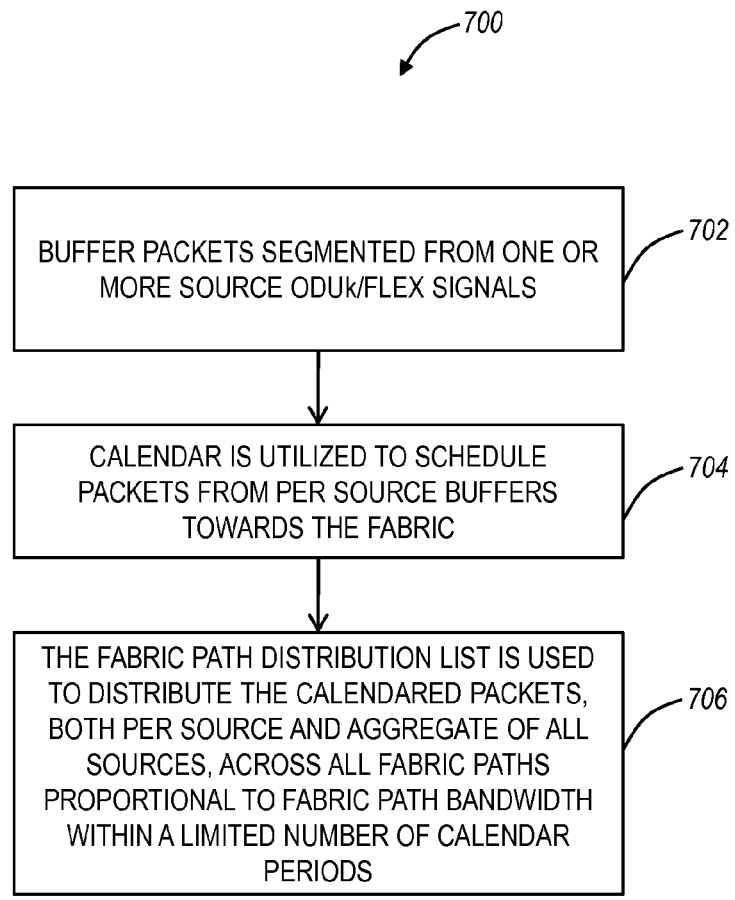
Figure 8:
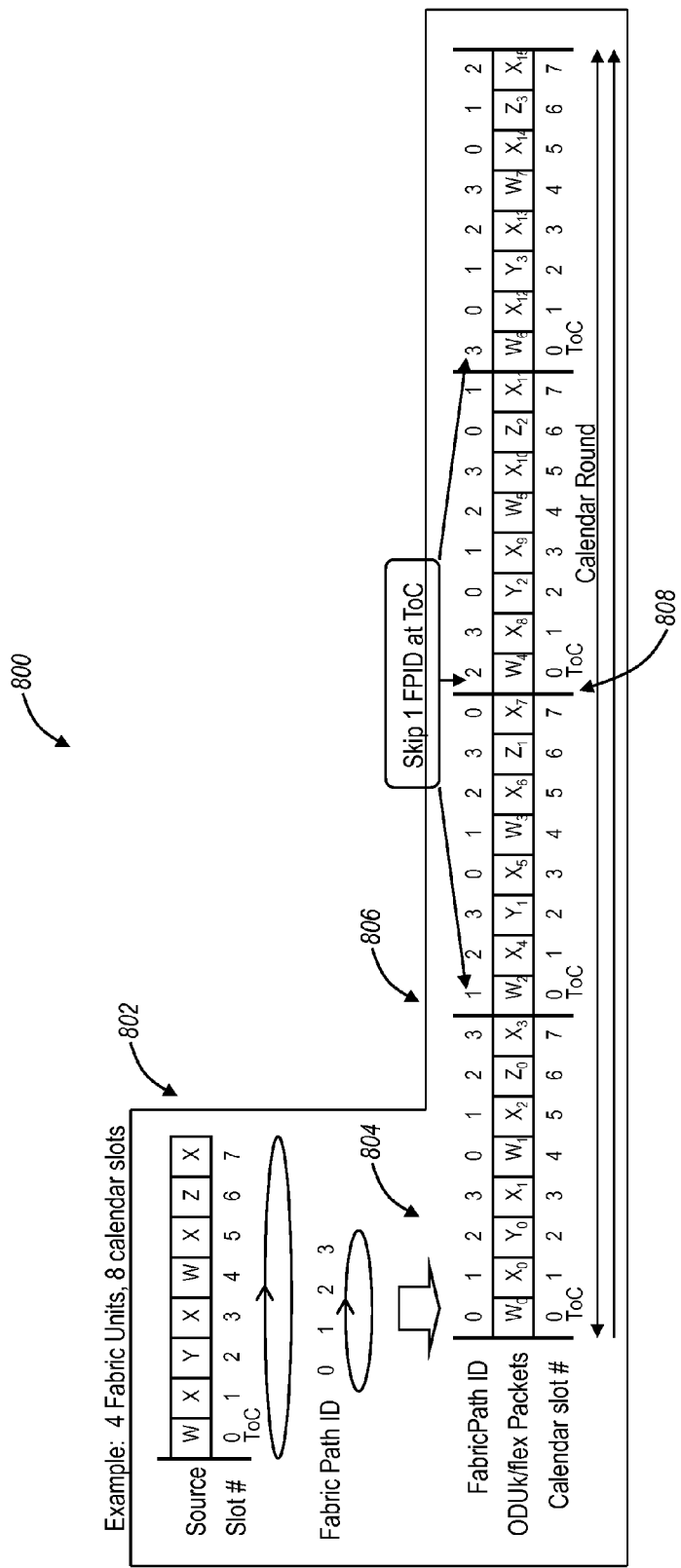
FIG. 8 is a diagram of an exemplary operation of the packet distribution method of FIG. 7.

The methods of FIGS. 5 and 6 illustrate simple ways of meeting several requirements of the fabric ingress scheduler and method. Both methods are concerned with the operation of the ingress scheduler, specifically fabric path distribution. In both methods it is assumed that packets are sent towards the fabric in order of segmentation completion in a smooth flow with no bursts that exceed the maximum ingress packet rate. The method of FIG. 5 distributes the per connection load evenly across all fabric units, which helps to achieve a non-blocking fabric, minimizes the fabric unit output queue fill and prevents packet loss due to output queue congestion in the fabric. However this method does not balance the ingress fabric interface aggregate load evenly across the fabric paths, possibly resulting in head-of-line blocking in the fabric interface. The method of FIG. 6 is a simple method for avoiding head-of-line blocking in the fabric interface, but does not meet the per connection distribution requirements of FIG. 5. FIGS. 7 and 8 are a basic view of the operation of the ingress scheduler of the present invention, which is essentially a combination of the methods of FIGS. 5 and 6. The methods and descriptions of FIGS. 5-8 assume that the scheduled aggregate packet flow is smooth with no bursts that exceed the maximum ingress packet rate, and that the ingress fabric links have enough bandwidth to carry the maximum ingress packet rate, with a minimal amount of speedup.

Figure 5A:
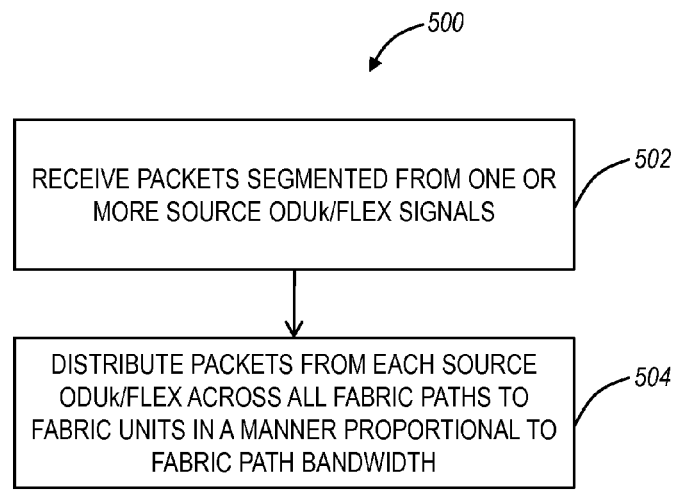
FIGS. 5a and 5b are a flowchart of a source signal distribution method of the present invention and a diagram of an exemplary operation of the source signal distribution method.
Figure 5B:
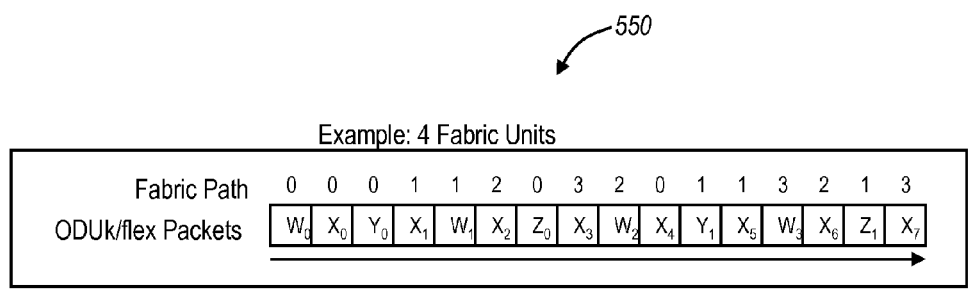

Referring to FIGS. 5a and 5b, in an exemplary embodiment, a flowchart illustrates a source signal distribution method 500 and an exemplary operation 550 of the source signal distribution method 500. Packets segmented from one or more source ODUk/Flex signals are received (step 502). The packets are distributed from each source ODUk/Flex signal across all fabric paths to fabric units in a manner proportional to fabric path bandwidth (step 504). For example, with four fabric paths of equal bandwidth, one quarter of the packets per ODUk/flex traverse each of the fabric paths, and here the ideal would be simple round robin of the packets from each ODUk/flex across the fabric paths. In an exemplary embodiment, a worst case fabric element output FIFO depth, i.e. for the FIFOs 416, assuming 32 packets for 3 links=11 packets/FIFO with greater than 32*4 packet times to drain before next possible burst, for a 40G port card with 4 fabric units. The exemplary operation 550 illustrates an exemplary operation over four fabric paths 0, 1, 2, 3 with ODUk/Flex packets $W_n$, $X_n$, $Y_n$, $Z_n$ where n equals 0, 1, 2, . . . . Based on the packet distribution method 500, the ODUk/Flex packets $W_n$, $X_n$, $Y_n$, $Z_n$ are distributed in a manner proportional to fabric path bandwidth. Specifically, packets with n=0 are sent over the path 0, with n=1 over the path 1, with n=2 over the path 2, with n=3 over the path 3, with n=4 over the path 0 again, and the like.

Figure 6A:
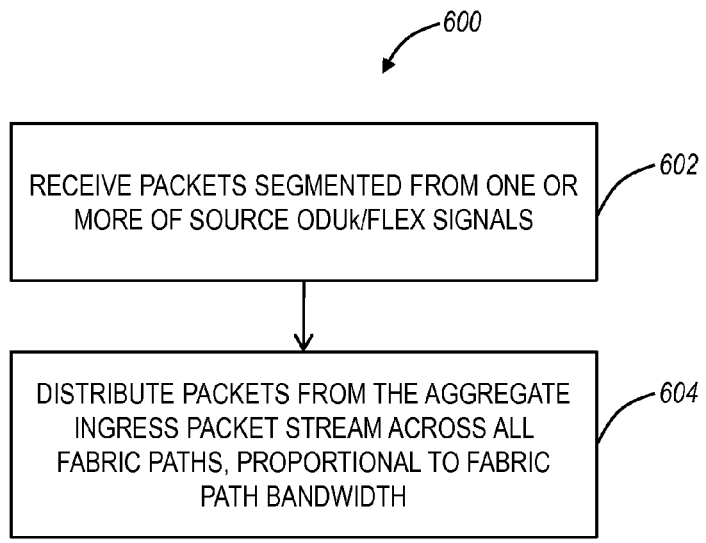
FIGS. 6a and 6b are a flowchart of an aggregate distribution method of the present invention and a diagram of an exemplary operation of the aggregate distribution method.
Figure 6B:
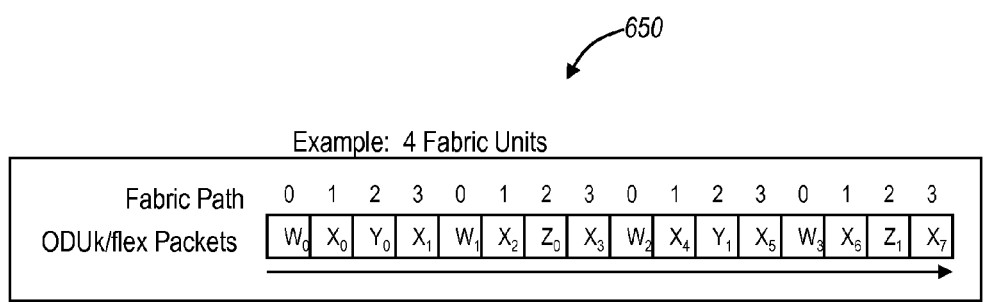

Referring to FIGS. 6a and 6b, in an exemplary embodiment, a flowchart illustrates an aggregate distribution method 600 and an exemplary operation 650 of the aggregate distribution method 600. The fabric interface 206 may have very shallow fabric link FIFOs 416 fed from the common FIFO 410. Disadvantageously, the source signal distribution method 500 by itself may cause the fabric interface 206 fabric path link FIFOs 416 to overflow due to the lack of coordination between ODUk/flex packet flows, resulting in queuing and possible head-of-line blocking in the common FIFO 410, possibly backpressure across the interface 403 to the ingress SAR 402, and longer maximum transit latency through the fabric interface 206. Head-of-line blocking in the common FIFO 410 may further result in under-utilization of fabric links and packet discards in either the fabric interface or the SAR. Thus, the aggregate distribution method 600 provides a mechanism to avoid the aforementioned issues. In particular, the aggregate distribution method 600 receives an aggregate ingress packet stream (step 602) segmented from one or more ODUk/flex sources. The packets from the aggregate ingress packet stream are distributed across all fabric paths, proportional to fabric path bandwidth, so that the fabric path link FIFOs never overflow (step 604). To avoid queuing and possible head-of-line blocking in the common FIFO 410, each fabric path must have sufficient bandwidth to carry its share of the aggregate load and packet bursts to each fabric path must be controlled. For example, a simple round robin of the aggregate ingress packet stream across four fabric paths of equal bandwidth minimizes the number of packets buffered for each fabric path.

With an ideal fabric interface 206 distribution, where the packet stream to each fabric path is distributed to the link FIFOs in a round robin manner, the link FIFO depth is minimized. The exemplary operation 650 illustrates an exemplary operation over four fabric paths 0, 1, 2, 3 with ODUk/Flex packets $W_n$, $X_n$, $Y_n$, $Z_n$ where n equals 0, 1, 2, . . . . Based on the aggregate distribution method 600, the ODUk/Flex packets $W_n$, $X_n$, $Y_n$, $Z_n$ are distributed in round robin order, e.g. the first packet goes to fabric path 0, the second packet to fabric path 1, etc. Disadvantageously, the aggregate distribution method 600 by itself does not provide even distribution of source traffic across fabric paths; fabric unit output FIFO depth is not bounded and may result in packet loss due to fabric unit output FIFO overflow. In an exemplary embodiment, the source signal distribution method 500 and the aggregate distribution method 600 may be used together.

Referring to FIG. 7, in an exemplary embodiment, a flowchart illustrates a packet distribution method 700 of the present invention utilizing the source signal distribution method 500 and the aggregate distribution method 600. To combine the source signal distribution method 500 and the aggregate distribution method 600, the packet distribution method 700 utilizes a calendar plus a fabric path distribution list. Basically, the benefits of the aggregate distribution method 600 are achieved in one calendar period (for this example; generally in at most one calendar round), and the benefits of source signal distribution method 500 are achieved over one calendar round. Specifically, packets are segmented from various source ODUk/Flex signals received at an ingress SAR (step 702). At the ingress SAR, a calendar is utilized to schedule packets from a buffer in the ingress SAR onto an inter-device interface (step 704). For example, the buffer in the ingress SAR may be the FIFOs 404 and the inter-device interface may be the interface 403. The calendar may be implemented via the scheduler 406. In an exemplary embodiment, each ODUk/flex may be assigned one or more slots in the calendar, for a fixed ingress packet order. With the packets calendared on the inter-device interface 403, the fabric interface 206 receives the packets from the inter-device interface 403 and may distribute the packets across all fabric paths proportional to fabric path bandwidth (step 706). The fabric path distribution list may be part of the ingress scheduler 406. The calendar determines the packet order, and the fabric path distribution list determines the fabric path for each packet. The calendar may traverse the calendar slots in round robin order once every calendar period, thus providing a fixed order of source packet opportunities.

In an exemplary embodiment with a distribution list of fabric paths of equal bandwidth, the distribution list may include round robin through a list of fabric paths which may advance one entry for each calendar slot. Further, the fabric ingress scheduler and method may ensure that the distribution list "beats against" the calendar so that each calendar slot is associated with each fabric path over some minimal number of calendar periods (calendar round). This is the reason for relatively prime list lengths, or rather a property of them. When the effective calendar length is relatively prime with the distribution list length, the number of calendar periods in a calendar round is equal to the number of entries in the distribution list. For example, with a calendar of eight slots and a distribution list of four fabric paths, at top of calendar, one entry of the distribution list may be skipped thereby shifting the fabric packet distribution list such that the next fabric path is used. In this manner it takes four calendar periods for every calendar slot to associate with each fabric path once.

Referring to FIG. 8, in an exemplary embodiment, a diagram illustrates an exemplary operation 800 of the packet distribution method 700. The exemplary operation 800 illustrates an exemplary operation over four fabric paths 0, 1, 2, 3 with four sources W, X, Y, Z and associated ODUk/Flex packets $W_n, X_n, Y_n, Z_n$ where n equals 0, 1, 2, ... from the four sources. Further, the exemplary operation 800 includes four fabric units and a total of eight calendar slots per calendar round. As described in the packet distribution method 700, at a point 802 in the exemplary operation 800 packets are sourced from the four sources W, X, Y, Z, such as at the ingress SAR, and assigned to a calendar slot. In this exemplary embodiment, the packets are sourced from W, X, Y, X, W, X, Z, X for the first calendar period and as such the packets are assigned sequential slots in the calendar period. From here and at a point 804, the calendared packets are assigned to different fabric paths in a round robin fashion to fabric paths 0, 1, 2, 3, 0, 1, 2, 3. In the next calendar period at a point 806, the fabric path distribution list (FPID) skips or shifts such that the calendared packets are assigned to fabric paths 1, 2, 3, 0, 1, 2, 3, 0. Further in the subsequent calendar period at a point 808, the fabric path distribution list (FPID) skips or shifts such that the calendared packets are assigned to fabric paths 2, 3, 0, 1, 2, 3, 0, 1, etc.

In the method 600 and exemplary operation 650 of FIG. 6, the interval between packets directed to the same fabric path is uniform, i.e., every fourth packet is directed to the same fabric path. However, in the method 700 of FIG. 7 and the exemplary operation 800 of FIG. 8, there is some variation in the packet interval to a fabric path due to the skipping of a distribution list entry every calendar period, although the average interval over one calendar round is the same. For example, with fabric path 3, the intervals are 4, 3, 4, 3, 4, 3, 4, 7, with an average of 4. This increases link FIFO fill by less than one packet compared to the method 600 and exemplary operation 650 of FIG. 6. This increase is significantly smaller than the method 500 of FIG. 5 would require to avoid link FIFO overflow.

In an exemplary embodiment, the ingress scheduler 406 may include two lists, a calendar which determines which source is eligible to send the next packet, and a distribution list which determines which fabric path link group the next packet will traverse into the fabric units 210. Each source may be assigned a number of calendar entries (slots) proportional to its rate, where each slot represents an opportunity to send a single packet. The start of calendar execution is paced (periodic), so that each slot offers a guaranteed maximum rate through the switch fabric 104. In the distribution list, each fabric path is assigned a number of entries proportional to its bandwidth. The effective lengths of the two lists may be relatively prime (a⊥b), each list is served in a fixed round robin order, and the list pointers advance in unison. These characteristics provide proportional and deterministic distribution of packet transfer opportunities for all sources across all fabric paths, within a distribution list length number of calendar periods (a calendar round), which enables a non-blocking fabric. The ingress scheduler 406 minimizes the maximum fabric unit 210 output queue fill and eliminates the probability of congestion loss in the fabric unit 210 output queues, which minimizes both the worst case fabric latency and the required fabric link speedup. The fabric interface 206 aggregate traffic is also distributed proportionately across all fabric paths in a manner that eliminates the probability of fabric interface 206 common FIFO head-of-line blocking.

Figure 9:
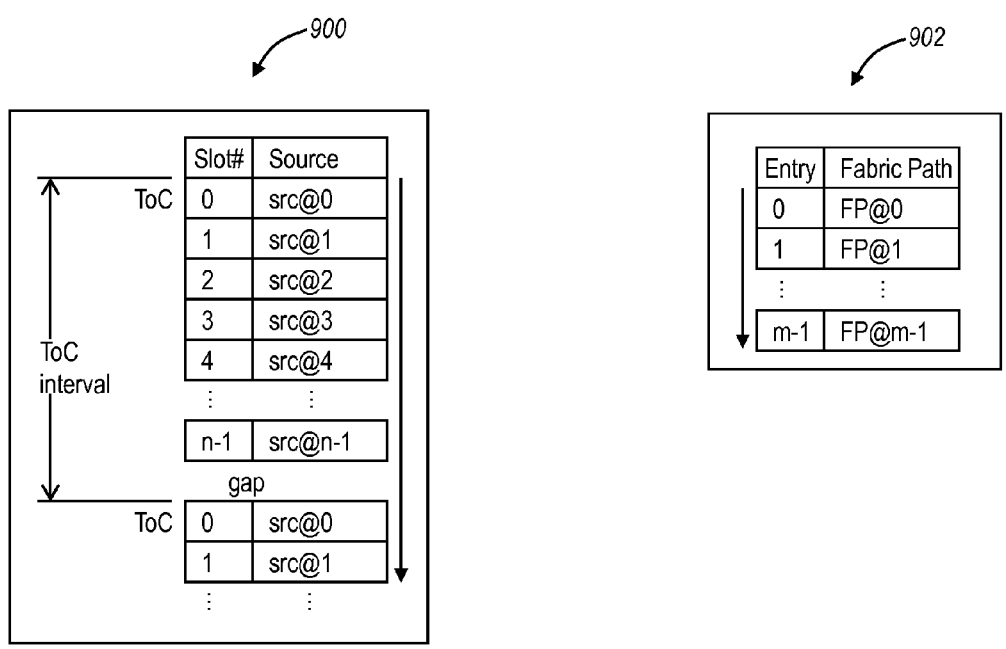
FIG. 9 is a diagram of an exemplary calendar and an exemplary fabric path distribution list.

Referring to FIG. 9, in an exemplary embodiment, diagrams illustrate an exemplary calendar 900 and an exemplary fabric path distribution list 902. As described herein, the calendar 900 may be used to schedule ODUk/flex packets from the per source buffers 404 towards the switch fabric 104, one packet opportunity per calendar slot with only full packets sent. The calendar effectively includes n slots, n is an integer that is relatively prime with the number of fabric path distribution list 902 entries m. Each source buffer 404 is assigned a number of slots proportional to its source rate. Unassigned slots are marked as idle. ToC refers to top of the calendar and is an interval representing one full calendar period. The ToC interval defines the available bandwidth per calendar slot for a given fabric packet payload length. ToC interval does not need to be synchronized across port cards, nor does it need to be identical in period. In an exemplary embodiment, for an OTU3 capable port card, each of 32 slots may be required to carry close to 1.31 Gbps, and with a 120 byte fabric packet payload, the maximum ToC interval is approximately 732.82 ns. With a distribution list length m of 4 or 8 entries (neither is relatively prime with 32), either an additional idle slot is added to the calendar (33 is relatively prime with both 4 and 8), or the ingress scheduler is configured to skip one distribution list entry every ToC interval which effectively adds one idle slot to the calendar, making the effective calendar length n relatively prime with the distribution list length m.

The fabric path distribution list 902 identifies the fabric path link group 420 from the fabric interface 206 to the fabric units 210. The fabric path distribution list 902 contains a list of fabric path IDs (FPID) that identifies the particular fabric path link group for each successive packet scheduled by the calendar. Each fabric path is assigned a number of entries proportional to its bandwidth. There is typically one ingress fabric path 420 from each fabric interface 206 to each fabric unit 210, although it is possible to have more than one. The ingress scheduler 406 associates a fabric path 420 with each scheduled packet. The fabric interface 206 directs each packet to its specified fabric path link group (e.g., using the selector $R_1$ 412) and further selects a link within the link group (e.g., using the distributor D 414). The characteristics of the fabric interface 206 algorithm for distributing packets across links within the fabric path link group may affect the arrangement of FPIDs within the fabric path distribution list.

With an ideal fabric interface 206 distribution algorithm, the packets for each fabric path are distributed across the fabric link FIFOs within the fabric path link group so that link FIFO fill is minimized. In this case the distribution list may reflect simple fabric path link group bandwidth proportionality, i.e., a single entry for each fabric path when fabric path rates are identical. With a less than ideal fabric interface 206 distribution algorithm, it may be necessary to configure the distribution list in a slightly more complex manner to achieve minimal delay through the link FIFOs, and possibly to avoid head-of-line blocking in the fabric interface 206 common FIFO. Each fabric path may require multiple entries that may be successive, where the multiple entries may be the number of links in the fabric path link group. For example, with two fabric paths A and B of three links each, the fabric path distribution list could contain A, A, A, B, B, B. This solution requires all fabric interface 206 fabric links to be the same rate to maintain fabric path rate proportionality in the fabric path distribution list.

Figure 10A:
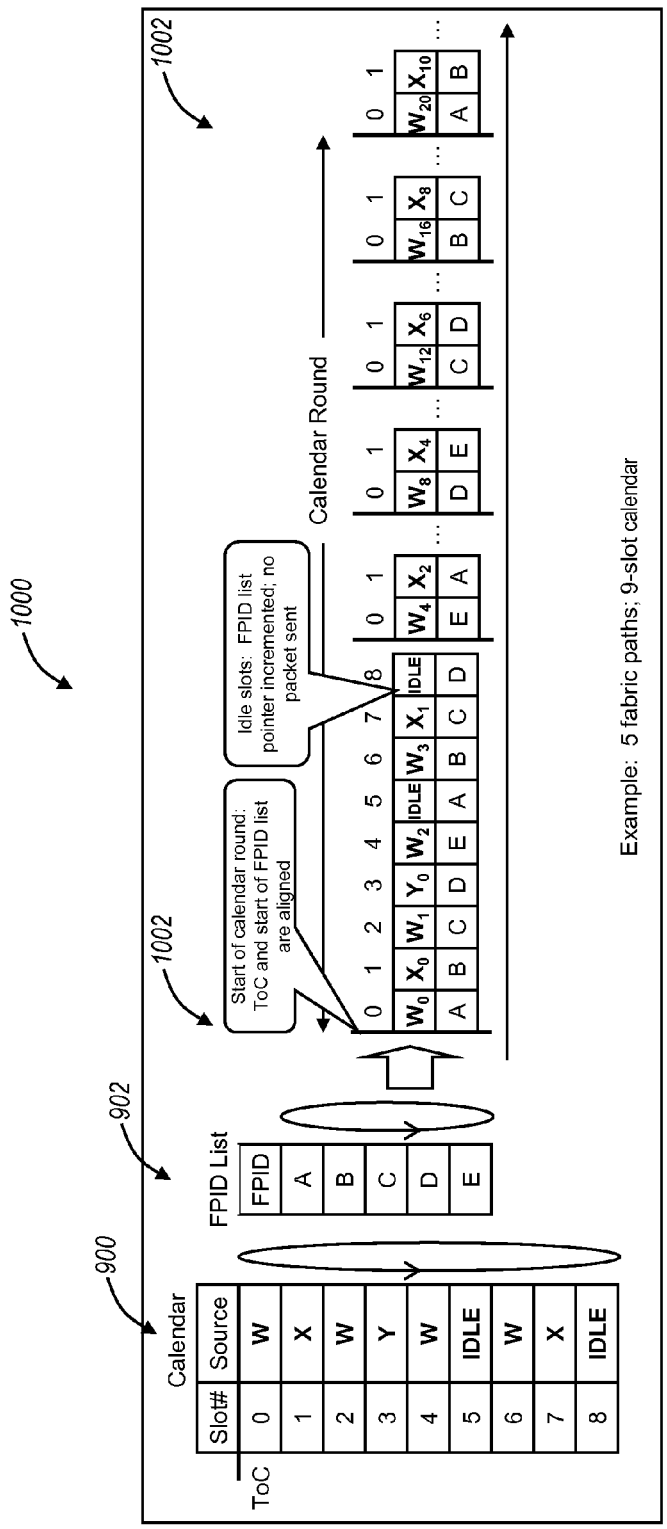
FIG. 10a is a diagram of an exemplary operation of the calendar of FIG. 9 interacting with the fabric path distribution list of FIG. 9.

Referring to FIG. 10a, in an exemplary embodiment, an exemplary operation 1000 illustrates the calendar 900 interacting with the fabric path distribution list 902. As described herein, the exemplary operation 1000 illustrates an exemplary operation where the fabric interface connects to the switch fabric via five fabric paths of equal capacity, A, B, C, D, E. There are three sources W, X, Y with associated ODUk/Flex packets $W_n, X_n, Y_n$ where n equals 0, 1, 2, . . . from the three sources. Further, there may be idle slots in the calendar 900. In this example, the calendar 900 is filled up with W, X, W, Y, W, IDLE, W, X, IDLE. Eight of the calendar slots are available for source traffic, although one of the eight is not required and is set to idle. A ninth slot is required to make the two list lengths relatively prime, and is set to idle. The fabric path distribution list 902 is set to A, B, C, D, E. Thus, in the exemplary operation 1000, the calendar 900 determines the order in which source buffers 404 send packets towards the fabric and the fabric path distribution list 902 determines which fabric path each successive packet is sent to. At a point 1002, for the start of a calendar round, the lists in the calendar 900 and the fabric path distribution list 902 are aligned. The fabric path distribution list 902 pointer is incremented for each calendar slot including idle slots. Since the number of calendar slots is relatively prime to the number of fabric path distribution list entries, each slot is associated with each fabric path distribution list entry within a calendar round. For example, the five packet opportunities $W_0, W_4, W_8, W_{12}, W_{16}$ for source w in slot 0 in the calendar round of FIG. 10 each use a different fabric path, A, E, D, C, B respectively. Also, the aggregate packet traffic is distributed evenly across all fabric paths in a round robin manner, which bounds the number of packets sent to each fabric unit within a calendar period and so bounds the maximum fabric unit output FIFO fill.

Referring back to FIG. 4, in an exemplary embodiment, the switch fabric 104 may be partitioned into switch fabric module (SFM) 400 field replaceable units with one or more fabric units per switch fabric module, and the switch fabric may be designed with at least one redundant switch fabric module. If one switch fabric module fails, there is still sufficient fabric capacity to carry all offered traffic. The ingress scheduler 406 may be configured to work with any of the typical equipment protection schemes, e.g., 1+1, 1:N, with or without load sharing. For example, the port card 102 may include circuitry, firmware, hardware, software, etc. to implement the various methods described herein. FIG. 4 also illustrates the switching operation 100 with two switch fabric modules 400, i.e. A and B. The systems and methods described herein may be used with both A and B, or with only one switch fabric module, i.e. A or B. In an exemplary embodiment, the present invention may allow for an upgrade, downgrade, reconfiguration, etc. of the switch fabrics 104. For example, assume both of the switch fabric modules 400 (A and B) are operating and it is required to replace and/or upgrade switch fabric module 400B. Here, all traffic from the various fabric interfaces 206 will be moved to the single switch fabric module 400A. This is performed by reconfiguring the distribution lists 902 to stop sending packets to switch fabric module 400B, and sending only to the active switch fabric module 400A. To prevent packet loss, e.g., for hitless maintenance switching, reconfiguration of a distribution list should occur at the start of a calendar round. At this point, the switch fabric 104B may be removed, replaced, upgraded, etc. Once replaced, the switch fabric 104B may be configured and re-added to the distribution lists 902 which may move traffic back to the switch fabric 104B. Thus, the fabric paths to the fabric units 210 are controlled through the distribution lists 902.

Figure 10B:
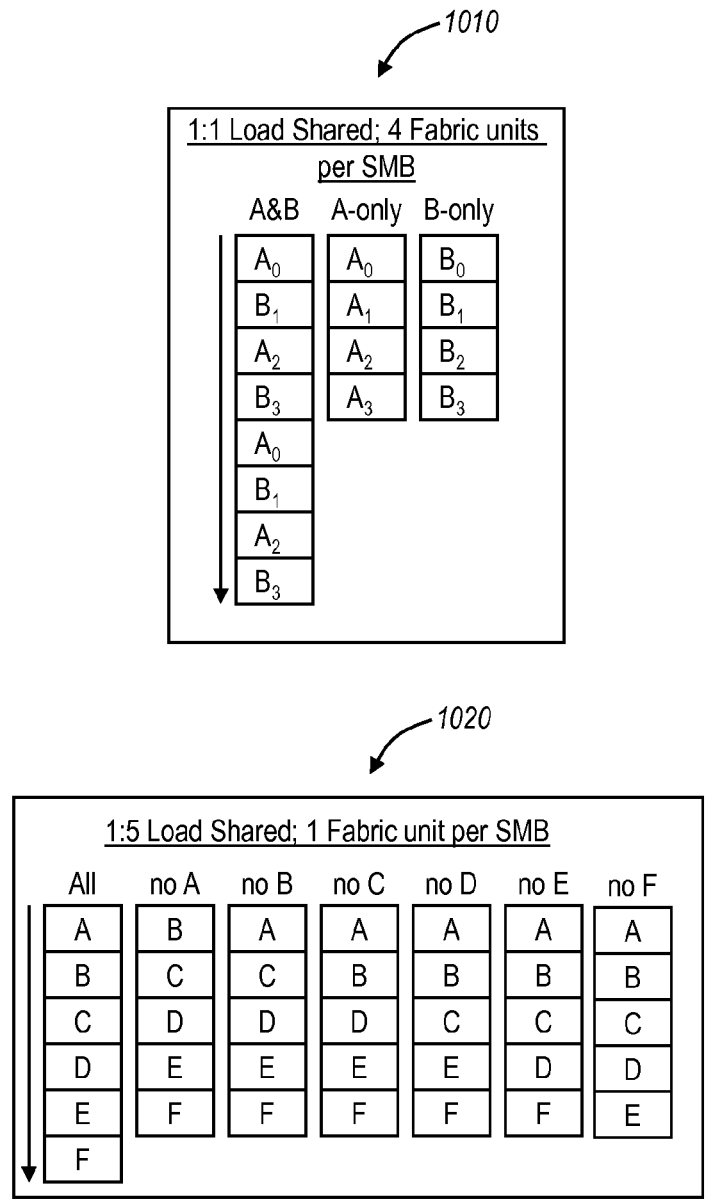
FIG. 10b is a diagram of exemplary fabric path identification lists for a 1:1 load sharing scenario and a 1:5 load sharing scenario.

Referring to FIG. 10b, in an exemplary embodiment, exemplary fabric path identification lists 1010, 1020 are illustrated for a 1:1 fabric module protection scenario with load sharing and a 1:5 fabric module protection scenario with load sharing. Specifically, the fabric path ID list 1010 is for a 1:1 load sharing scenario with for fabric units 210 per switch module 400. Here, there are two switch fabric modules 400 denoted as A and B and four fabric units on each denoted as $A_n$ and $B_n$ where n=0, 1, 2, 3. The fabric path ID list 1010 illustrates exemplary operation for A&B, A only, and B only. The fabric path ID list 1020 is for a 1:5 load sharing scenario with six switch modules 400 labeled as A, B, C, D, E, F with one fabric unit 210 per switch module 400. The fabric path ID list 1502 illustrates exemplary operation for all switch modules 400 working and for each of the switch modules 400 being inoperative. The distribution list is presented here as a preconfigured list, such that for fabric equipment protection/maintenance switching a minimum of two lists are needed, active and inactive, where the inactive list can be updated in the background, typically by software. It may be more beneficial to provide one list for each supported fabric configuration, e.g., N+2 lists for 1:N protection (list 1020). In the specific case of 1:1 protection, a filter could be applied to the FPIDs read from the active list to effect the protection switch, e.g., with the list A0, B1, A2, B0, A1, B2 no filter is applied for A&B load sharing, all As are forced to Bs when traffic is directed only to switch fabric module B, all Bs are forced to As when traffic is directed only to switch fabric module A. The distribution list could also be dynamically generated.

Figure 11:
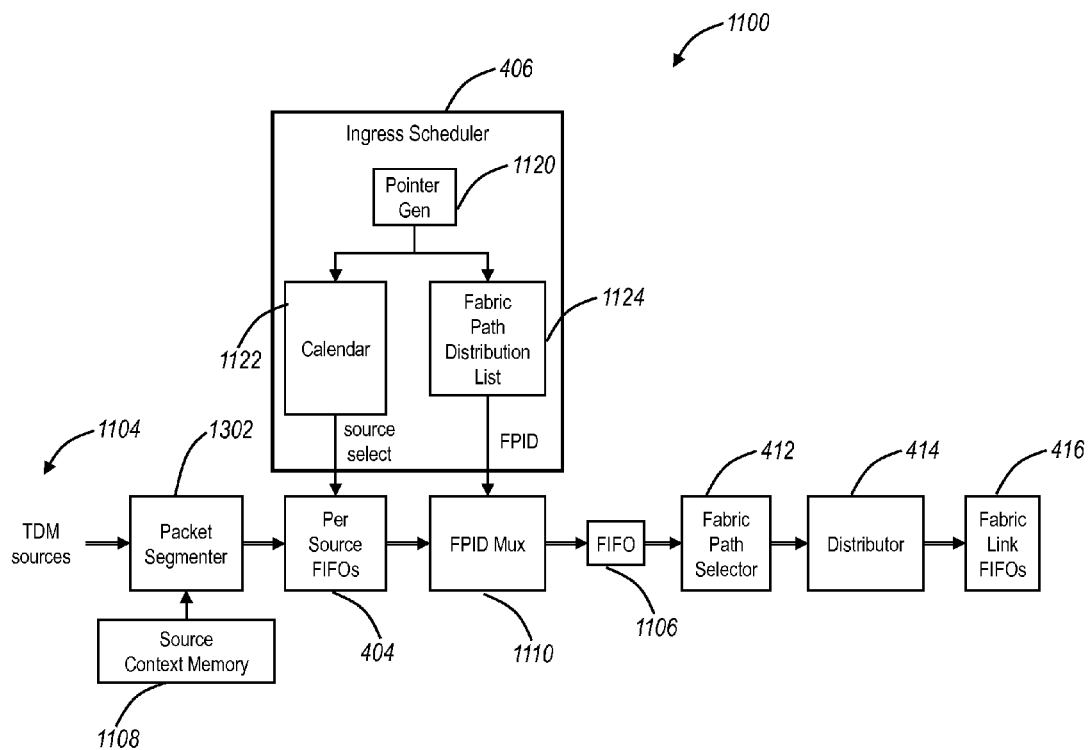
FIG. 11 is a block diagram of a scheduling system for implementing the ingress scheduler to schedule packets to a fabric.
Figure 12:
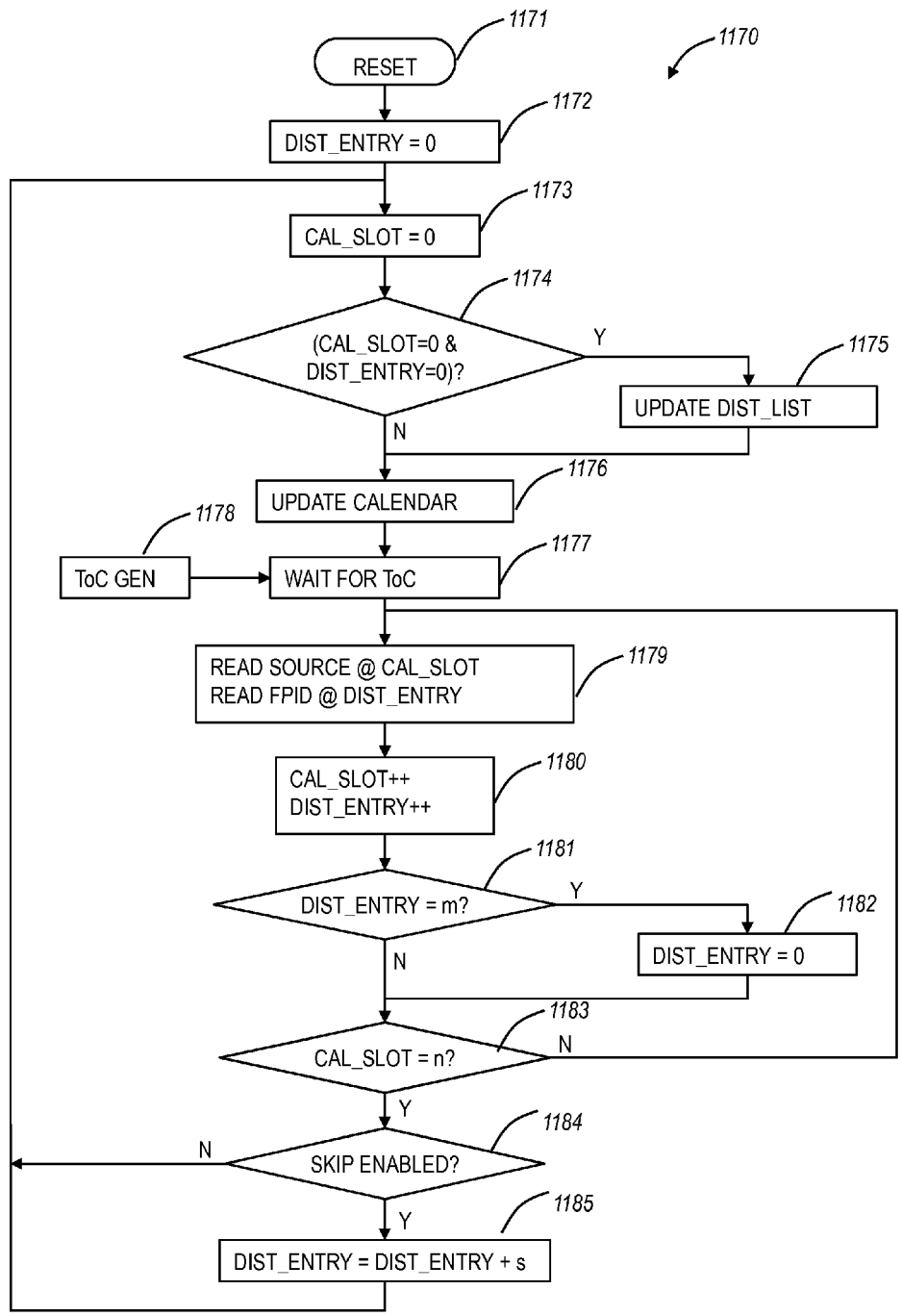
FIG. 12 is a flowchart of an operational method associated with a pointer generator for managing the calendar of length n and the fabric path distribution list of length m.
Figure 13:
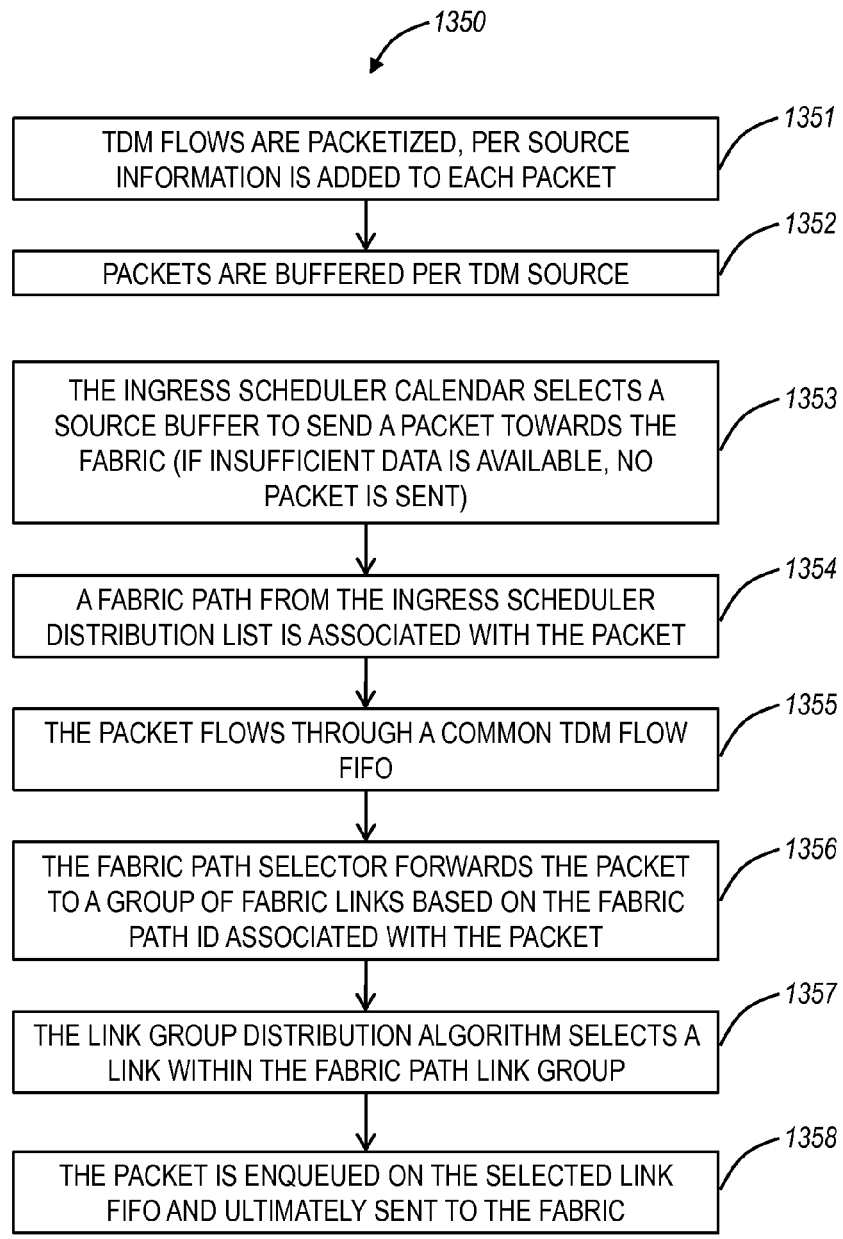
FIG. 13 is a flowchart of an operational method associated with the block diagram of FIG. 11.

Referring to FIGS. 11-13, in various exemplary embodiments, block diagrams and flowcharts illustrate functional blocks of an exemplary scheduling system 1100. The exemplary scheduling system 1100 is configured to implement the calendar 900 and the fabric path distribution list 902. In general, the functions associated with the systems and methods of the exemplary scheduling system 1100 may be performed by one or more processors, a content addressable memory, digital signal processors (DSPs), application specific integrated circuits (ASICs), field programmable gate array (FPGAs), any suitable programmable logic device, discrete gate or transistor logic, discrete hardware components, or any combination thereof, in combination with firmware, software, or the like. Each of the foregoing may be referred to generally as circuitry or logic. The exemplary scheduling system 1100 may include function of the ingress SAR 402 and the ingress scheduler 406. Also, in an exemplary embodiment, the ingress SAR 402 may be compatible with the Optical Internetworking Forum (OIF) Implementation Agreement (IA) for the "OTN over Packet Fabric Protocol" project OIF-0058, which is incorporated by reference herein. Additionally, the exemplary scheduling system 1100 illustrates various components associated with implementing the fabric ingress scheduler and method and other functions are omitted for simplicity.

Referring to FIG. 11, in an exemplary embodiment, a block diagram illustrates a scheduling system 1100 for implementing the ingress scheduler 406 to schedule packets to a fabric. The scheduling system 1100 provides a generalized system without reference to the partitioning of functions into devices or the inter-device interface 403. Specifically, the scheduling system 1100 receives TDM source flows 1104 and deterministically schedules and distributes the packetized flows across the fabric units that include a switch fabric. A packet segmenter 1102 segments the TDM source flows 1104 into packets, adds information to the packets from a source context memory 1108, and enqueues the packets on the per source FIFOs 404. The FIFOs 404 are required here because source packet creation is typically not synchronized to the calendar and because the calendar is typically configured to schedule faster than the nominal source rate. The ingress scheduler 406 includes the pointer generator 1120 communicatively coupled to the calendar block 1122 and the fabric path distribution list block 1124. In operation, the pointer generator 1120 manages list pointers for a calendar and a fabric path distribution list. The calendar block 1122 selects the per source FIFO 404 for each packet opportunity based on the calendar. The fabric path distribution list block 1124 selects a fabric path (FPID) based on the fabric path distribution list and associates it with the scheduled packet via the FPID Mux (1110).

The need for the FIFO 1106 depends on the implementation. If the ingress scheduler 406 slot rate within a calendar period is faster than the downstream logic or data path can handle and/or there is a risk of link FIFO overflow, the FIFO 1106 is required, either on the aggregate or one per fabric path. In this case, the distribution list must be configured to avoid head-of-line blocking in the FIFO 1106. If the link FIFOs are deep enough and the fabric path select and distribution logic (blocks 412, 414) can keep up with any scheduler bursts, no FIFO is required and the FPID from the ingress scheduler may directly control the selector 412. Each packet is directed to a particular fabric path link group via a selector 412 based on the FPID associated with the packet and input into a fabric link FIFO 416 selected by a distributor 414. There are several natural partitioning of functions within the scheduling system 1100 for implementation. As shown in FIG. 4, the SAR and ingress scheduler may be implemented in a separate device from the fabric interface. Another partitioning has the ingress scheduler implemented within the fabric interface device, and the SAR function in a separate device. Alternatively, the SAR, the ingress scheduler and the fabric interface functions may all reside in the same device. Other partitionings are not precluded and contemplated by the fabric ingress scheduler and method.

Referring to FIG. 12, in an exemplary embodiment, a flowchart illustrates an operational method 1170 associated with the pointer generator 1120 for managing the calendar of length n and the fabric path distribution list of length m. As described herein, n and m are integers and may be relatively prime with respect to one another. Following a reset (step 1171), a distribution list entry pointer (DIST_ENTRY) is initialized to 0 (step 1172) and a calendar slot pointer (CAL_SLOT) is reset to 0 (step 1173). A calendar round boundary occurs when both pointers are equal to 0 (step 1174), allowing the distribution list (DIST_LIST) to be updated or swapped (step 1175) if required, typically for fabric equipment protection switching. At the calendar period boundary (CAL_SLOT equals 0), the calendar may be updated (step 1176), typically so that source connections may be added, modified or deleted. The operational method 1170 waits for the periodic top of calendar (ToC) indication (step 1177) from a ToC generator (step 1178). Next, the operational method 1170 reads a source to send a packet from at the current CAL_SLOT and a fabric path ID to associate with the packet at the current DIST_ENTRY (step 1179). The CAL_SLOT and the DIST_ENTRY pointers are incremented (step 1180) after each read. When the end of the distribution list is reached, i.e., DIST_ENTRY equals m (step 1181), then the DIST_ENTRY pointer is reset to 0 (step 1182). Until the last slot in the calendar has been read, i.e., while CAL_SLOT<n (step 1183), the operational method 1170 returns to step 1179. When the last slot in the calendar has been read, i.e., CAL_SLOT equals n (step 1183), if the skipping of distribution list entries is enabled (step 1184) the DIST_LIST pointer is incremented by the number of entries to skip s (step 1185), and finally the operational method 1170 returns to step 1173 where the CAL_SLOT pointer is reset to 0.

Referring to FIG. 13, in an exemplary embodiment, a flowchart illustrates an operational method 1350 associated with the scheduling system 1100 of FIG. 11. TDM flows are packetized and per source information is added to each packet (step 1351). The packets are then buffered per TDM source such as in the FIFOs 404 (step 1352). The ingress scheduler calendar selects a source buffer of the FIFOs 404 to send a packet towards the fabric (step 1353). If there is insufficient data available, no packet is sent. The fabric path distribution list block 1124 associates a fabric path from the ingress scheduler fabric distribution list with the packet (step 1354). The packet flows through a common TDM flow FIFO 410 (step 1355). The fabric path selector forwards the packet to a group of fabric links based on the fabric path ID associated with the packet (step 1356). A link group distribution algorithm selects a link within the fabric path link group (step 1357). Finally, the packet is queued on the selected link FIFO 1114 and ultimately sent to the fabric (step 1358).

Figure 14:
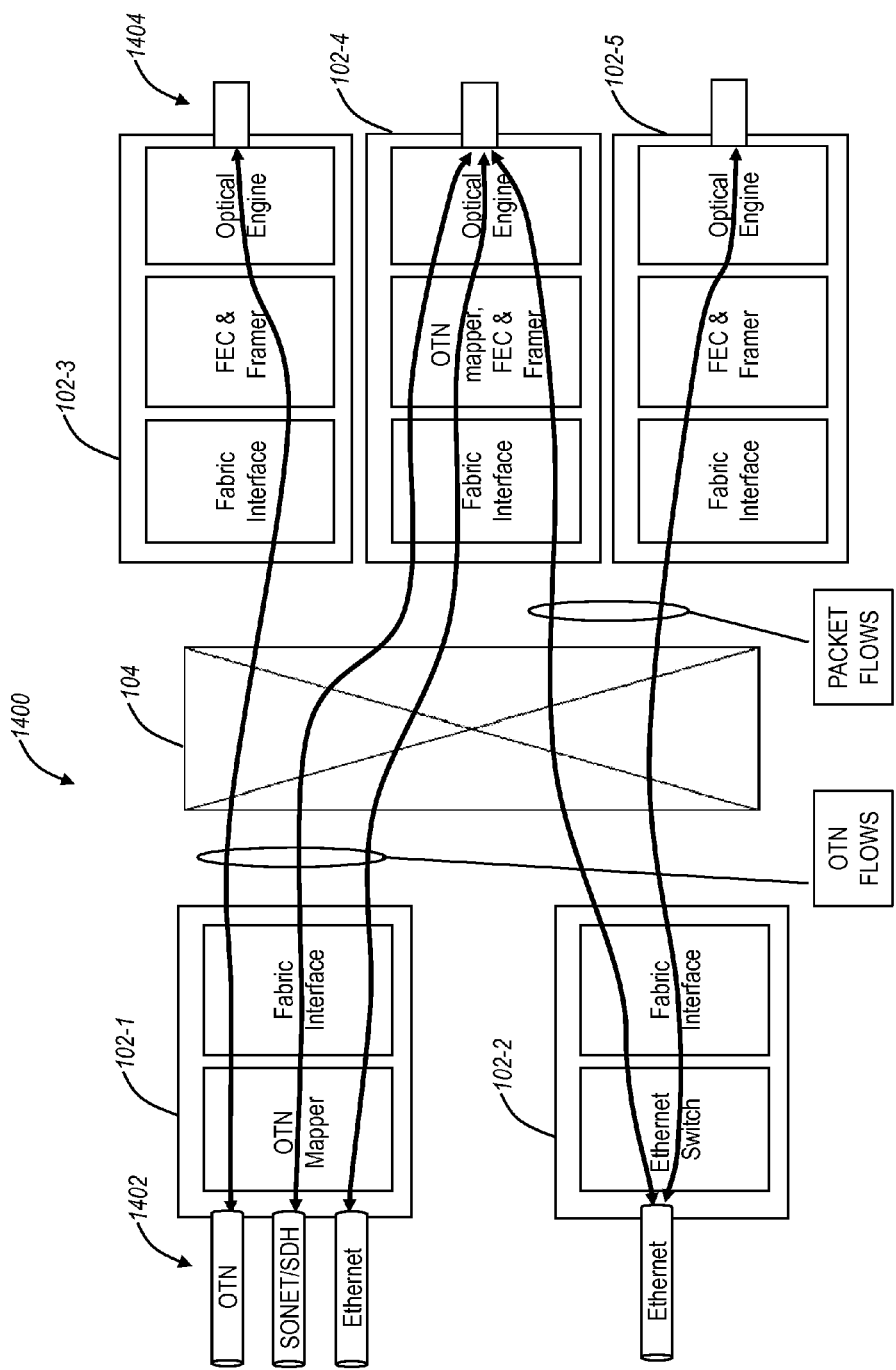
FIG. 14 is a block diagram of an optical system configured to utilize the fabric ingress scheduler and method of the present invention.

Referring to FIG. 14, in an exemplary embodiment, a block diagram illustrates an optical system 1400 configured to utilize the fabric ingress scheduler and method. In particular, FIG. 14 illustrates a bidirectional system between client interfaces 1402 and line interfaces 1404. The optical system 1400 may be a network element that is an optical cross-connect (OXC), optical switch, multi-service provisioning platform (MSPP), TDM add/drop multiplexer (ADM), dense wave division multiplexer (DWDM) platform, router, Ethernet switch, and the like. The fabric ingress scheduler and method of the present invention has been described herein with reference to OTN, and those of ordinary skill in the art will recognize the fabric ingress scheduler and method may be utilized with any TDM or constant bit rate (CBR) protocol and that the method can be used to switch multiple protocols simultaneously in a common packet fabric. Interfaces 1402 and 1404 may include OTN, SONET, SDH, Ethernet, Fibre Channel, Digital Video, and the like. The various port cards 102-1, 102-2, 102-3, etc are configured to physically receive the client or line signals and to process them into their switchable components, and forward to the switch fabric as packetized TDM flows via the ingress scheduler of the present invention and/or as native packet flows. The port cards are also configured to process the switched TDM and packet flows and to transmit them on optical interfaces 1402, 1404, etc. Processing may include mapping, de-mapping, multiplexing, de-multiplexing, circuit emulation, etc. The fabric interfaces 206 described herein in combination with the ingress SARs 402 may implement the scheduling and calendaring associated with the fabric ingress scheduler and method. In the optical system 1400, the fabric interfaces 206 may be adapted to OTN, packet, and the like. The fabric ingress scheduler and method contemplates use for efficiently and deterministically providing packets to fabric units 210. The fabric units 210 may be "off-the-shelf" fabric elements used for switching packet traffic. For example, the fabric units 210 may be a self-routing switching element that integrates full-duplex serial links.

In an exemplary embodiment, the switch fabric 104 may be a packet switching fabric that is common to both TDM or CBR packetized traffic and native packet traffic, e.g. from the port card 102-2. In this way, the switch fabric 104 receives packets from both the port cards 102-1, 102-2 and switches accordingly. The fabric ingress scheduler and method may be utilized to deterministically provide the packetized TDM or CBR traffic to the switch fabric 104 as described herein. The native packet traffic such as from the port card 102-2 may be provided to the switch fabric 104 using native packet techniques as are known in the art. Port card 102-4 supports the switching of both packetized TDM or CBR traffic and native packet traffic. Packetized TDM or CBR traffic is prioritized over the native packet traffic through the fabric interface and through the switch fabric. Thus, the packetized TDM or CBR traffic may be provided with determinism to the switch fabric using the fabric ingress scheduler and method using the calendaring and fabric path distribution list.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims. In various exemplary embodiments described herein, the two switch fabric modules 400 are denoted in some embodiments as A and B. This may include two switch fabric modules 400 for 1:1 redundancy. However, those of ordinary skill will recognize the present invention contemplates an arbitrary number of switch fabric modules 400 and is not specifically limited to two. Furthermore, the present invention contemplates various redundancy methods including 1+1, 1:1, 1:N where one switch fabric module 400 is used to protect N working switch fabric modules 400.

What is claimed is:
1. A method, comprising:
 receiving source signals;
 segmenting packets from the source signals;
 buffering the packets;
 scheduling and distributing the packets to a plurality of fabric units in a deterministic and proportional manner;
 performing the scheduling based on a calendar comprising calendar slots and a calendar period of effective length n, n being an integer; and
 performing the distributing based on a fabric path distribution list of length m, m being an integer;
 wherein the deterministic and proportional manner comprises each calendar slot of the calendar associating with each distribution list entry of the fabric path distribution list once every m calendar periods; and
 wherein the deterministic and proportional manner utilizes at least one of i) n and m being relatively prime therebetween and ii) the scheduling and distributing step skipping at least an entry in the fabric path distribution list every calendar period of the calendar making an idle slot thereby causing n and m effectively to be relatively prime therebetween.

2. The method of claim 1, wherein the scheduling and distributing the packets comprises:
 scheduling the packets towards the fabric via a fabric interface; and
 distributing the scheduled packets to the plurality of fabric units using a fabric path distribution list of fabric paths associated with the plurality of fabric units.

3. The method of claim 2, wherein the fabric path distribution list comprises a number of entries for each of the fabric paths proportional to bandwidth associated with each.

4. The method of claim 2, wherein the scheduling the packets comprises assigning a packet source or idle to a plurality of calendar slots forming the calendar period; and the distributing comprises:
 for each packet, sending the packet to one of the plurality of fabric paths based on a current fabric path distribution list entry in the fabric path distribution list and updating the current pointer; and
 for each idle, updating the current fabric path distribution list entry.

5. The method of claim 4, wherein the distributing utilizes the fabric path distribution list in a repetitive fixed order.

6. The method of claim 5, further comprising:
 progressing one fabric path distribution list entry in the fabric path distribution list for every calendar slot.

7. The method of claim 1, wherein the plurality of fabric units are included on a plurality of switch modules; and the method further comprising:
 adding or removing one of the plurality of switch modules from the distributing in service.

8. The method of claim 1, wherein plurality of fabric units is selected without requiring speed up.

9. A packet fabric ingress scheduler, comprising:
 one or more ingress buffers receiving packets;
 a calendar scheduler configured to select each of the packets from the one or more ingress buffers based on a calendar comprising calendar slots and with a calendar period comprising an effective length n, n being an integer;
 a selector connected to a plurality of fabric units and receiving the packets from the one or more ingress buffers based on the calendar scheduler; and
 a fabric path distribution list scheduler configured to distribute packets to the plurality of fabric units from the selector based on a fabric path distribution list comprising a length m, m being an integer;
 wherein the calendar scheduler, the selector, and the fabric path distribution list scheduler operate in a deterministic and proportional manner comprising each calendar slot of the calendar associating with each distribution list entry of the fabric path distribution list once every m calendar periods; and
 wherein the deterministic and proportional manner utilizes at least one of i) n and m being relatively prime therebetween and ii) the calendar scheduler, the selector, and the fabric path distribution list skipping at least an entry in the fabric path distribution list every calendar period of the calendar making an idle slot thereby causing n and m effectively to be relatively prime therebetween.

10. The packet fabric ingress scheduler of claim 9, wherein the calendar scheduler and the fabric path distribution list scheduler are configured to distribute the packets to the plurality of fabric units in a deterministic manner.

11. The packet fabric ingress scheduler of claim 9, wherein the calendar scheduler is configured to select each of the packets into one of a plurality of slots associated with the calendar period; and
 wherein the fabric path distribution list scheduler is configured to distribute the packets based on the fabric path distribution list of fabric paths associated with the plurality of fabric units.

12. The packet fabric ingress scheduler of claim 11, wherein the fabric path distribution list comprises a number of entries for each of the fabric paths proportional to bandwidth associated with each.

13. The packet fabric ingress scheduler of claim 11, each of the calendar scheduler and the fabric path distribution list scheduler comprise a pointer that is updated concurrently.

14. A system, comprising:
 one or more port cards;
 one or more switch modules comprising a plurality of fabric units;
 a plurality of fabric paths interconnecting the one or more port cards and the plurality of fabric units; and a scheduling system to provide packetized traffic from time division multiplexed or constant bit rate signals to the plurality of fabric units in a deterministic and proportional manner;

wherein the scheduling system comprises a calendar comprising calendar slots and with a calendar period comprising an effective length n, n being an integer, and a fabric path distribution list comprising a length m, m being an integer;

wherein the deterministic and proportional manner comprises each calendar slot of the calendar associating with each distribution list entry of the fabric path distribution list once every m calendar periods; and wherein the deterministic and proportional manner utilizes at least one of i) n and m being relatively prime therebetween and ii) the scheduling system skipping at least an entry in the fabric path distribution list every calendar period of the calendar making an idle slot thereby causing n and m effectively to be relatively prime therebetween.

15. The system of claim 14, wherein the one or more switch modules are configured to switch the packetized traffic and native packet traffic thereon.

16. The system of claim 14, wherein the scheduling system comprises:

a calendar scheduler configured to select packets from the packetized traffic from one or more buffers;

a selector connected to a plurality of fabric units and receiving the packets from the one or more buffers based on the calendar scheduler; and a fabric path distribution list scheduler configured to distribute packets to the plurality of fabric units from the selector.

* * * * *